March 11, 1969 W. VAN DEN BUSSCHE 3,432,084

GUIDE PLATE FOR MAGNETIC TAPE

Filed June 27, 1967

INVENTOR.
WILLEM VAN DEN BUSSCHE

BY

AGENT

INVENTOR.
WILLEM VAN DEN BUSSCHE
BY
AGENT

INVENTOR.
WILLEM VAN DEN BUSSCHE

BY

Frank R. Trifari

AGENT

INVENTOR.
WILLEM VAN DEN BUSSCHE
BY
Frank R. Trifari
AGENT

INVENTOR.
WILLEM VAN DEN BUSSCHE
BY
[signature]
AGENT

United States Patent Office 3,432,084
Patented Mar. 11, 1969

3,432,084
GUIDE PLATE FOR MAGNETIC TAPE
Willem van den Bussche, Emmasingel, Eindhoven, Netherlands, assignor to North American Philips Company, Inc., New York, N.Y., a corporation of Delaware
Filed June 27, 1967, Ser. No. 649,223
Claims priority, application Netherlands, June 30, 1966, 6609088
U.S. Cl. 226—197 2 Claims
Int. Cl. B65h 23/32

ABSTRACT OF THE DISCLOSURE

A single plate for guiding tape on and off an angularly mounted cylindrical tape drum. The guide serves to maintain the tape in a substantially level plane as it is transported from the supply reel to the receiving reel via the cylindrical drum. Deflecting faces on each end of the plate are angularly aligned to receive and pass the tape along the desired path.

The invention relates to a guide plate for a tape-shaped record carrier intended to be secured to a cylindrical tape-guiding drum of an apparatus for recording and/or playing back magnetic records on the carrier. The tape-shaped carrier is guided on and off the drum via partially cylindrical deflecting faces along one of the longitudinal edges of a plate.

In known apparatus of the kind set forth in which the tape is scanned on the "helical-scan" principle, the drum and deflecting faces in the form of pins are arranged at releatively different acute angles to the base plate. In order to obtain the desired course of the tape, these angles have to meet severe tolerance requirements, such that mounting the drum and the pins at the different angles to the base plate involves difficulties during manufacture such that the costs of the apparatus are materially raised.

According to the invention a guide plate is mounted on a cylindrical scanning drum on a recorder/reproducer. The plate has on each of its ends an elongation, a portion of which is tangential to the surface of the drum and a second portion of which is bent at an oblique angle with the first portion. The elongation forms a guiding and deflecting face to control movement of the tape onto the receiving side and from the exiting side of the drum.

An embodiment of a guide plate according to the invention employed with a drum around which the tape is guided through 180° in a helical path is explained with reference to the drawing.

Figure 1:
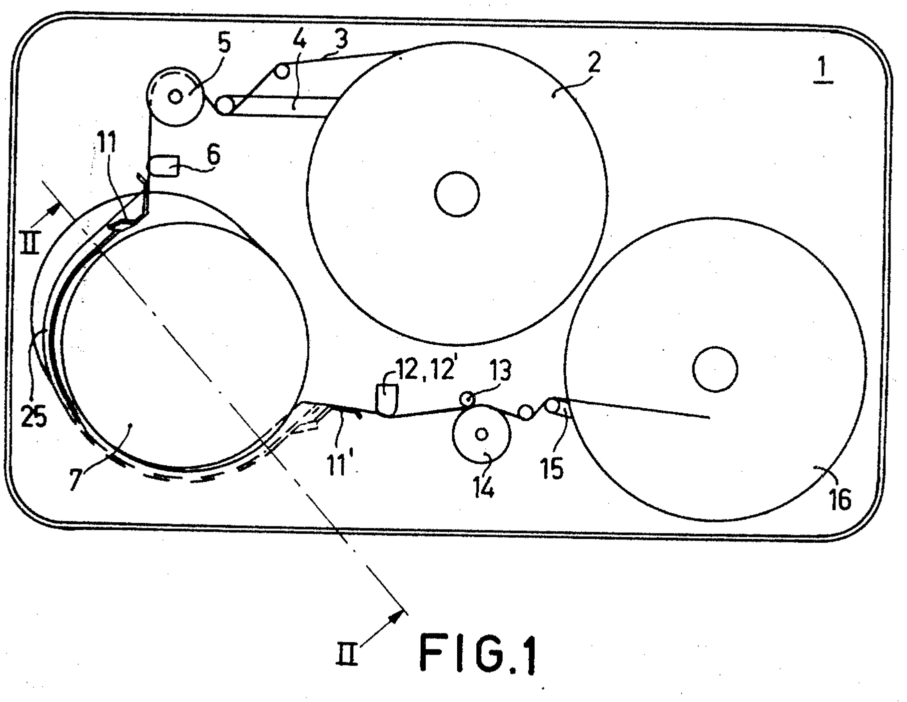
FIG. 1 is a plan view of an apparatus for recording and/or playing back magnetic records, comprising a guide plate according to the invention.
Figure 2:
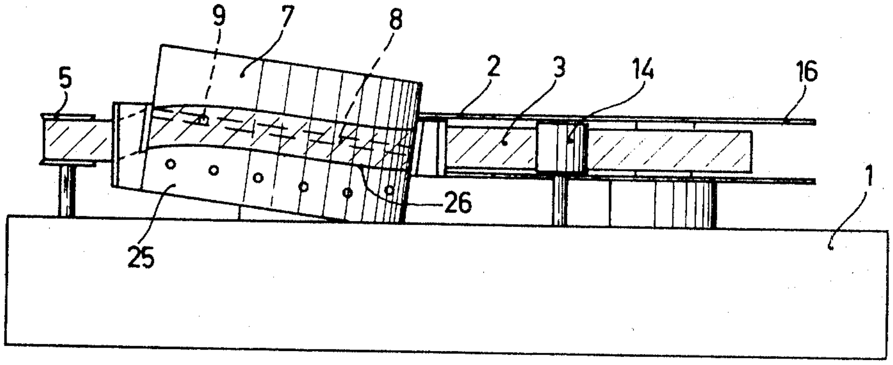
FIG. 2 is a side elevation of the apparatus taken on the line II—II in FIG. 1.

The embodiment of the apparatus shown in FIGS. 1 and 2 includes a base plate 1, a supply spool 2 for a tape-shaped record carrier 3 mounted thereon, a tensioning arm 4, a guide roller 5, an erasing head 6 and a drum 7, around which the tape 3 is guided helically through 180°. The wall of the drum is interrupted by a circumferential axial slot 8. Tape scanning members 9, operative in the drum slot, are arranged at equal angular distances on a rotatable support inside the drum and form the portion of the apparatus employed for recording and/or playing back video signals using the "helical-scan" principle. The "helican-scan" apparatus is not the subject matter of the invention, so that it will not be further described. A guide plate 25, mounted on the drum having a longitudinal edge 26 serves as a guide for the tape on the drum and is provided with elongations touching the drum having bent-over deflection faces 11 and 11'. A synchronizing head 12 and an audio-head 12', which may be integral with each other, a driving spindle or capstan 13, the latter of which cooperates with a pressure roller 14, a second tensioning arm 15 and a take-up spool 16, are the elements receiving the tape after it leaves the drum 7. The center lines of the drum 7 and of the partially cylindrical deflecting faces 11, 11' are at different acute angles to the base plate. The take-up and supply spools 16 and 2 respectively are arranged substantially in one plane parallel to the base plate 1( FIG. 2). The angle between the center line of the drum 7 and the deflecting faces 11, 11' and the base plate is chosen accordingly. The above will be described more fully with reference to FIGS. 3 to 6, which relate to a so-called twin-head apparatus, i.e. an apparatus in which the tape is guided over 180° around the drum; however, the invention is not restricted to such a twin-head apparatus.

Figure 3:
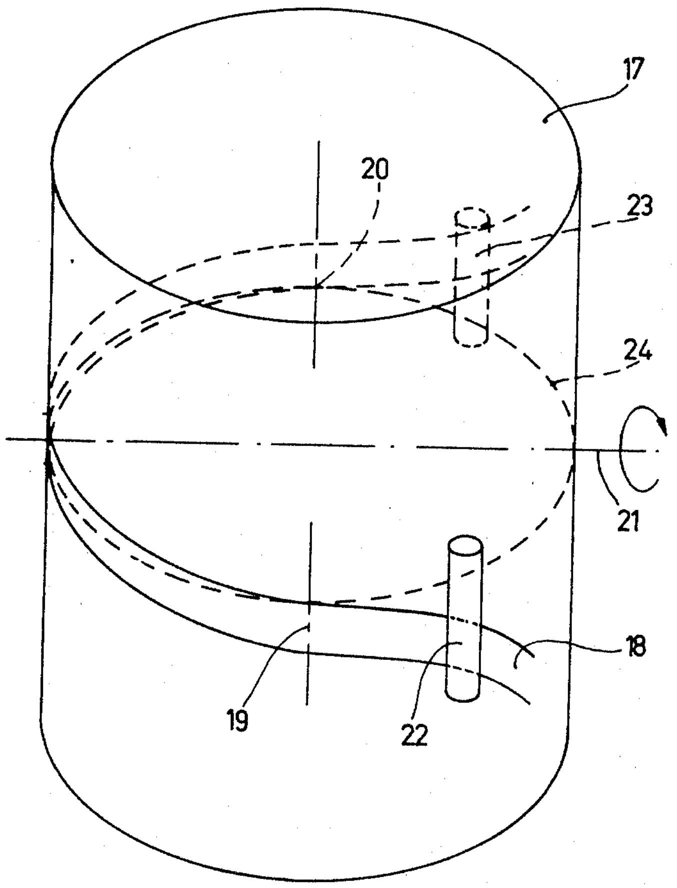
FIG. 3 shows diagrammatically a video drum with deflecting faces arranged at right angles to a base plate.

It will be apparent from FIG. 3, which shows diagrammatically a drum 17, mounted at right angles to the base plate, that the difference of height of the helically wound tape with respect to the base plate at the areas of the tangential lines 19 and 20 can be obviated by tilting the drum about an axis 21 normal to the plane going through the tangential lines 19 and 20. With further tilting of the drum tape at the areas of the deflecting faces 22 and 23 is substantially level with respect to the base plate.

Figure 4:
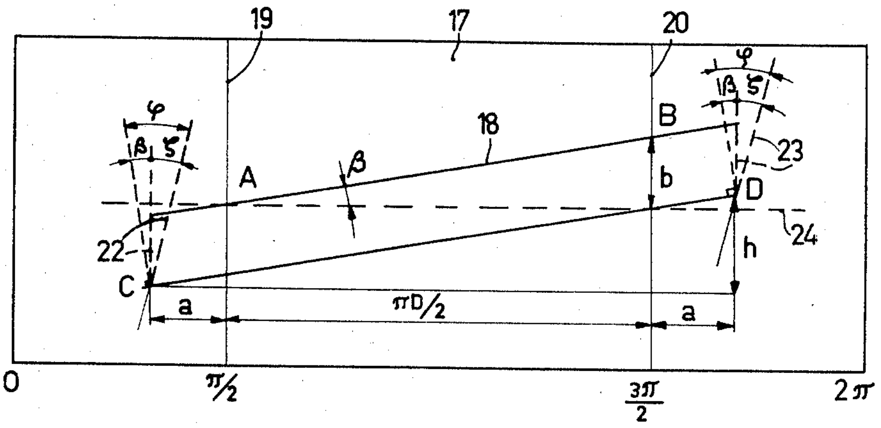
FIG. 4 is a developed view of the cylindrical drum of FIG. 3.

The oblique position of the drum is determined with reference to FIG. 4, which illustrates a developed view of the cylindrical drum and of the path of the tape of FIG. 3. in such a developed view a perpendicular section of the cylinder is a straight line so that the path of the scanning heads (9 in FIG. 2) is represented by a horizontal line 24. The helical line traced by the tape 18 around the cylinder 17 is also a straight line in the developed view, which is at an angle $\beta$ (the pitch angle) to the line 24 of the path of the scanning heads.

It will be asumed that the tape touches the cylinder at $\pi/2$ and $3\pi/2$, indicated by the lines 19 and 20, so that the tape is guided for 180° around the drum. The distance between the lines 19 and 20 is then equal to half the circumference of the drum, $\pi D/2$, wherein D is the diameter of the drum.

The pitch angle $\beta$ results from the formula $$\tan \beta = \frac{b}{\pi D/2}$$

wherein $b$ is the portion of the tape width to be used for recording the video tracks.

When the drum is tilted around the axis 21 (FIG. 3) at right angles to the plane going through the lines 19 and 20, that is to say the plane of drawing in FIG. 4, the difference in height between points A and B can be obviated by tilting through an angle having a tangent $b/D$. A is then moved over a distance $b$ upwards with respect to B. The tape 18 is, however, not bent at the areas of the lines 19 and 20, but it is bent at a distance $a$ from these lines, where the deflecting faces 22 and 23 are located. At the distance $a$ the difference in height between points C and D will be greater than $b$ (the diffrence in height between A and B).

The difference in height $h$ between the points C and D results from:

$$h=\frac{\pi D/2+2a}{\pi D/2}\times b$$

In order to eliminate the difference in height at the place of the deflecting faces 22 and 23, the drum has therefore to be lifted on one side over a distance $h$. From FIG. 5 it will be apparent that the angle $\gamma$ be tween the tilted drum axis and the normal to the base plate is given by: $\tan \gamma=b/D$.

Figure 5:
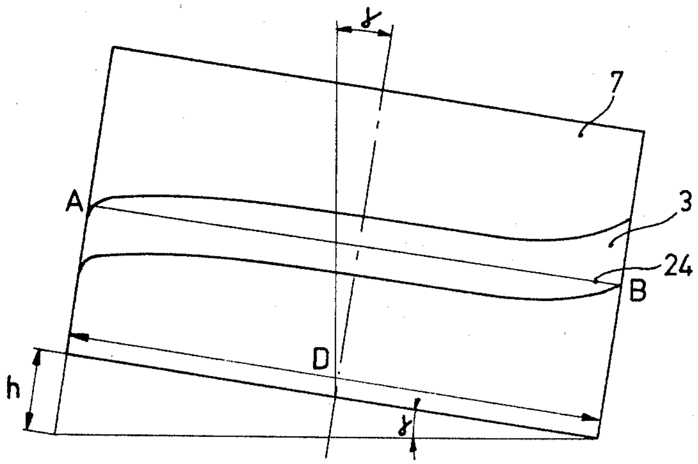
FIG. 5 shows diagrammatically a drum of the apparatus of FIGS. 1 and 2 is oblique position.

Since the tangential planes to the drum are at right angles to the plane of drawing in FIG. 5, they are also at an angle $\gamma$ to the said normal.

If it is asumed that the plane of FIG. 4 is curved only between the lines 19 and 20, that is through 180°, the non-curved portions represent said tangential planes. It appears that the course of the tape is directed upwards on one side and downwards on the other side at an angle $\beta$ to the horizontal so that to the section of the tangential plane and the base plate the tape is at an angle $+\beta$ on one side and at an angle $-\beta$ on the other side.

In order to ensure that the whole movement of the tape from the supply spool to the drum and from the drum to the take-up spool is performed in a path parallel to the base plate, wherein the plane of the tape is normal to the base plate, a tilting of the drum through the angle $\gamma$ alone is aparently not sufficient. Two further steps are required, i.e. the disposition of the partially cylindrical deflecting faces with respect to the drum and base plate and guiding of the tape through a given angle around said faces.

Both the angle $\phi$, the angle between the line of intersection of the deflecting faces and the normal to the base plate and the angle $\omega$, the angle between the deflecting faces, appear to be dependent upon the angle $\beta$ (pitch angle of the tape on the drum) and the angle $\gamma$ (the angle between the drum axis and the normal to the base plate). Hereinafter the relationship between the angle $\varphi$ and $\omega$ and the angles $\beta$ and $\gamma$ respectively will be illustrated. For the purpose of this illustration the following auxiliary angles are introduced: the angle $\delta$, the angle between the center line of a cylindrical deflecting face and a line parallel to the drum axis and the angle $\alpha$, the angle between the line of intersection of the planes in which the tape is moving and the base plate. These planes are at an angle $\omega$ to each other and their line of intersection represents an infinitely thin deflecting cylinder which is at an angle $\varphi$ to the normal to the base plate.

The following relation is found between the angles $\omega$ and $\alpha$:

$$\tan \alpha=\tan \omega \cos \varphi \quad (1)$$

The angle $\alpha$ is of practical value in plotting the course of the tape on the mounting plate.

From FIG. 4 it will be seen that lines 22 and 23, which represent diagrammatically the deflecting cylinders, are at an angle 90° $-\delta$ to the path 24 of the heads. The lines 23 and 24 are furthermore at an angle $\varphi$ to the perpendicular to the direction of the tape. This will be seen when considering that the tape portions on either side of the deflecting lines move in a plane at right angles to the base plate, the edges of the tape being parallel to the base plate, so that in the said plane the angle 90° $-\varphi$ must appear. This results in the relation:

$$\varphi=\delta+\beta \quad (2)$$

Consequently this relation represents the condition that the tape is running up and leaving respectively in a plane at right angles to the base plate, in which the edges of the tape are parallel to said base plate.

Figure 6:
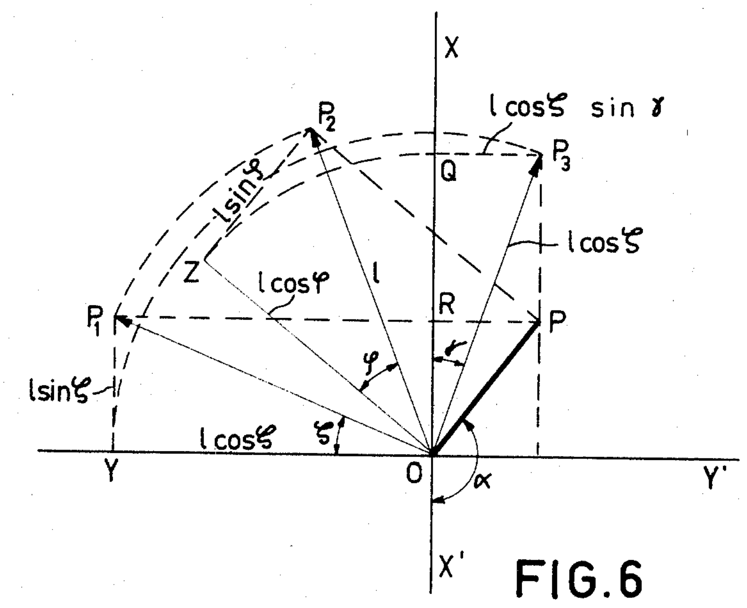
FIG. 6 illustrates the cylindrical portion of the deflecting face on the downtake side of the drum projected on the base plate.
Figure 7:
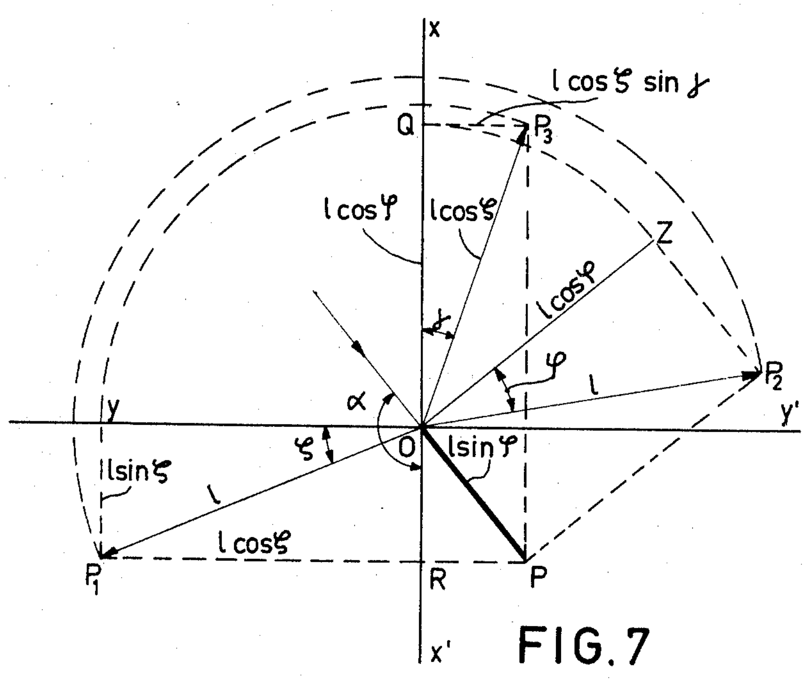
FIG. 7 is a projection similar to that of FIG. 6, but now of the cylindrical portion of the deflecting face on the uptake side of the drum.

The relations between the angles $\varphi$, $\delta$, $\gamma$ and $\alpha$ defined above will be determined with the help of FIGS. 6 and 7, which illustrate the situation of the deflecting cylinders on the exiting and the receiving sides respectively of the drum. Since the following considerations apply to both figures, the calculation is identical for the two sides of the drum.

The plane of the drawing represents the plane of the base plate. The projection of the deflecting cylinder on this plane is OP. The line XX′ is the line of intersection of the common tangent plane to the cylinder and the drum with the base or mounting plane. When this tangent plane is turned over to the left about the line XX′ into the plane of drawing, $OP_1$ represents the real length $l$ of the cylinder and $P_1OY$ represents the angle $\delta$.

When a perpendicular plane through the cylinder and onto the base plane is turned over to the left (in FIG. 6; to the right in FIG. 7) about the line OP, then $OP_2$ represents again the real length $l$ of the cylinder, whilst the angle $ZOP_2=\varphi$. Therefore $OP_1=OP_2=l$.

Finally, a plane at right angles to the XX′ axis going through O is turned over about the line YY′ into the plane of the drawing. This results in showing the angle $QOP_3=\gamma$. Furthermore $$OQ=OZ=l \cos \varphi \text{ and } OP_3=OY=l \cos \delta$$

The angle $\alpha$ is found again in the angle X′OP in FIG. 6 and in the angle XOP in FIG. 7.

It can now be stated:

$$OQ=l \cos \varphi=l \cos \delta \cos \gamma$$

so that $\cos \varphi=\cos \delta \cos \gamma$. Introducing $\delta=\varphi-\beta$ (see Equation 2) results in:

$$\text{Cos } \varphi=\cos (\varphi-\beta) \cos \gamma=(\cos \beta+\sin \varphi \sin \beta) \cos \gamma$$

or $$\cos \varphi(l-\cos \beta \cos \gamma)=\sin \varphi \sin \beta \cos \gamma$$

so that $$\frac{\sin \varphi}{\cos \varphi}=\tan \varphi=\frac{l-\cos \beta \cos \gamma}{\sin \beta \cos \gamma} \quad (3)$$

If, on the contrary, $\varphi=\delta+\beta$ is introduced, it is found in a similar manner that $$\tan \delta=\frac{\cos \beta-\cos \gamma}{\sin \beta} \quad (4)$$

From the figures it will furthermore be apparent that:

$$\tan \alpha=\frac{-l \cos \delta \sin \gamma}{l \sin \delta}=-\frac{\sin \gamma}{\tan \delta}$$

so that it follows together with (4)

$$\tan \alpha=\frac{\sin \beta \sin \gamma}{\cos \gamma-\cos \beta} \quad (5)$$

from which follows with (1) and $$\cos \varphi=\frac{l}{\sqrt{l+\tan^2 \varphi}}$$

$$\tan \omega=\pm\tan \gamma\frac{\sqrt{l-2 \cos \beta \cos \gamma+\cos^2 \gamma}}{\cos \gamma-\cos \beta} \quad (6)$$

It follows therefrom that at a given pitch angle $\beta$ and a tilting angle $\gamma$ of the drum, chosen on the basis of the directives given above the angles $\varphi$, $\delta$, $\alpha$ and $\omega$ can be directly calculated.

From FIG. 4 it will be apparent that the angles $\beta$, $\delta$ and $\varphi$ are located in one plane. The development of FIG. 4 provides an appropriate form of a guide plate according to the invention, shown in FIGS. 8 to 12.

Figure 11:
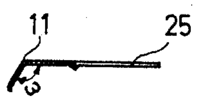
FIG. 11 is a cross-section view on the line XI—XI in FIG. 9.
Figure 12:
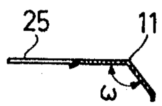
FIG. 12 is a cross-section view taken on the line XII—XII in FIG. 9.

The guide plate 25, having a central section with a longitudinal edge 26 which guides the tape on the drum, has at both ends elongations 27, 27' to form bent-over portions. These bent-over portions define a pair of faces 11 and 11' at an oblique angle to one another. The faces perform the function of cylindrical deflection faces for the tape on the receiving and exiting sides respectively of the drum. For this purpose the elongations 27, 27' are bent over through an oblique angle $\omega$ with respect to the lines 28, 28' of FIG. 8, which are at the said angle $\varphi$ to the normal to the guiding edge 26. FIGS. 11 and 12, show cross-sections of the elongations on the lines XI—XI and XII—XII respectively of FIG. 9.

If desired, the plate may be cut and bent over simultaneously, so that the manufacture of the deflecting faces combined with the guide plate will become very simple and economical.

Figures 8, 9:
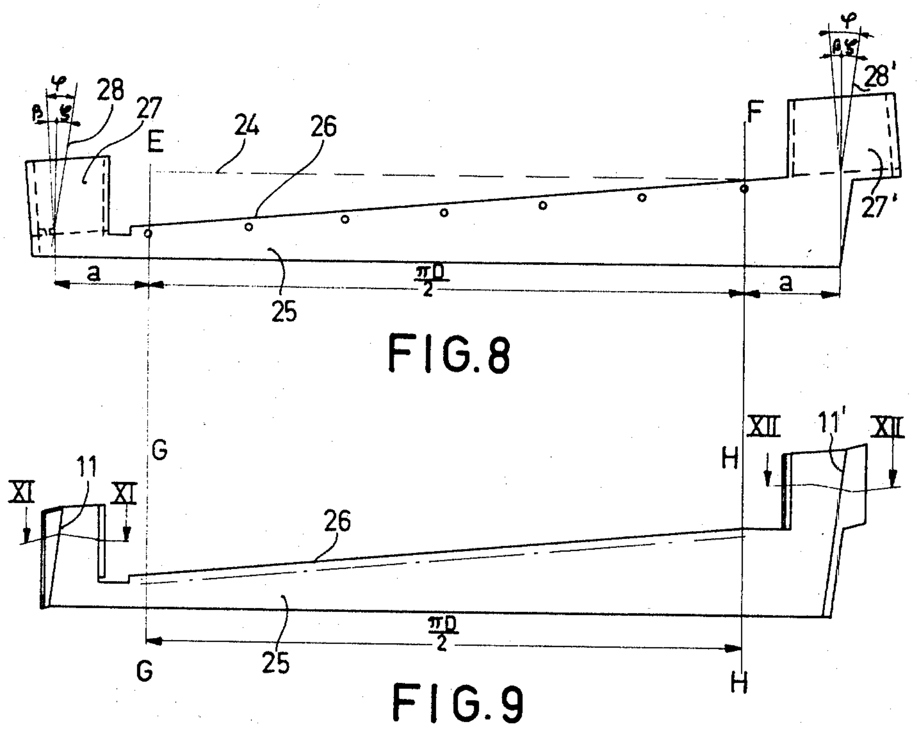
FIG. 8 shows a developed view of a guide plate according to the invention, employed in the apparatus of FIGS. 1 and 2.
FIG. 9 shows a guide plate of FIG. 8 with bent-over elongations.
Figure 10:
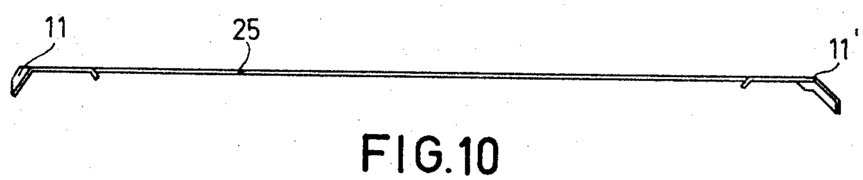
FIG. 10 is a plan view of the plate of FIG. 9.

The broken line 24 between E and F in FIG. 8 represents the path of the rotating tape scanning members (9 of FIG. 2).

When the plate is mounted on the drum, the plate is bent between the lines GG and HH cylindrically through 180° around the drum. The lower side of the plate is aligned in a plane at right angles to the drum axis. The two elongations 27 and 27' are then located in tangential planes of the drum, while the bent-over portions 11, 11' with the bending lines 28, 28' perform the functions of the conventional slanting deflecting pins.

It should be noted that the invention is not restricted to the embodiment of the guide plate described above. A guide plate according to the invention may serve, in general, for guiding a tape-shaped record carrier travelling along a complicated or noncomplicated path, in which the guide plate performs the functions of one or more conventional deflecting pins mounted on the base plate in oblique or non-oblique position.

What is claimed is:

1. The combination of a guide plate and a scanning drum for a recorder-reproducer comprising a cylindrical scanning drum positioned at an acute angle on one surface of said recorder/reproducer; and a guide plate attached to said scanning drum, said guide plate comprising a central section traversing at least 180° of the drum peripheral for guiding tape around said drum, said central section having one edge substantially parallel with said one surface of said recorder/reproducer, and a pair of elongations attached to each end of said central section defining tape deflecting faces, said elongations having a first face substantially tangent to the surface of said drum and a second face obliquely positioned with said first face, said faces defining deflecting surfaces for said tape whereby said tape is guided from a supply spool to said drum and off said drum onto a take-up spool in a path parallel to said one surface of said recorder/reproducer, wherein the plane of the tape is normal to said one surface.

2. The combination according to claim 1 wherein the oblique angle $\omega$ between the first face and said second face is defined by the function:

$$\tan \omega = \pm \tan \omega \frac{\sqrt{l - 2 \cos \beta \cos \gamma + \cos^2 \gamma}}{\cos \gamma - \cos \beta}$$

and the line of intersection between the oblique faces defines an angle $\varphi$ with the normal to said one edge of said central section defined by the function:

$$\tan \varphi = \frac{l - \cos \beta \cos \gamma}{\sin \beta \cos \gamma}$$

wherein:

$\beta$ is the pitch angle of said first edge around the drum, and $\gamma$ is the angle between the center line of said scanning drum and a normal to said one surface of said recorder/reproducer.

References Cited

UNITED STATES PATENTS

| | | | |
|---|---|---|---|
| 3,213,193 | 10/1965 | Konishi | 179—100.2 |
| 3,354,269 | 11/1967 | Rank | 179—100.2 |

ALLEN N. KNOWLES, *Primary Examiner.*

RICHARD A. SCHACHER, *Assistant Examiner.*